March 30, 1965 A. J. INTROVIGNE 3,176,257
BRACKET FOR HOLDING TRAILER PLUGS OF
TRACTOR-TRAILER VEHICLES
Filed March 8, 1963 2 Sheets-Sheet 1
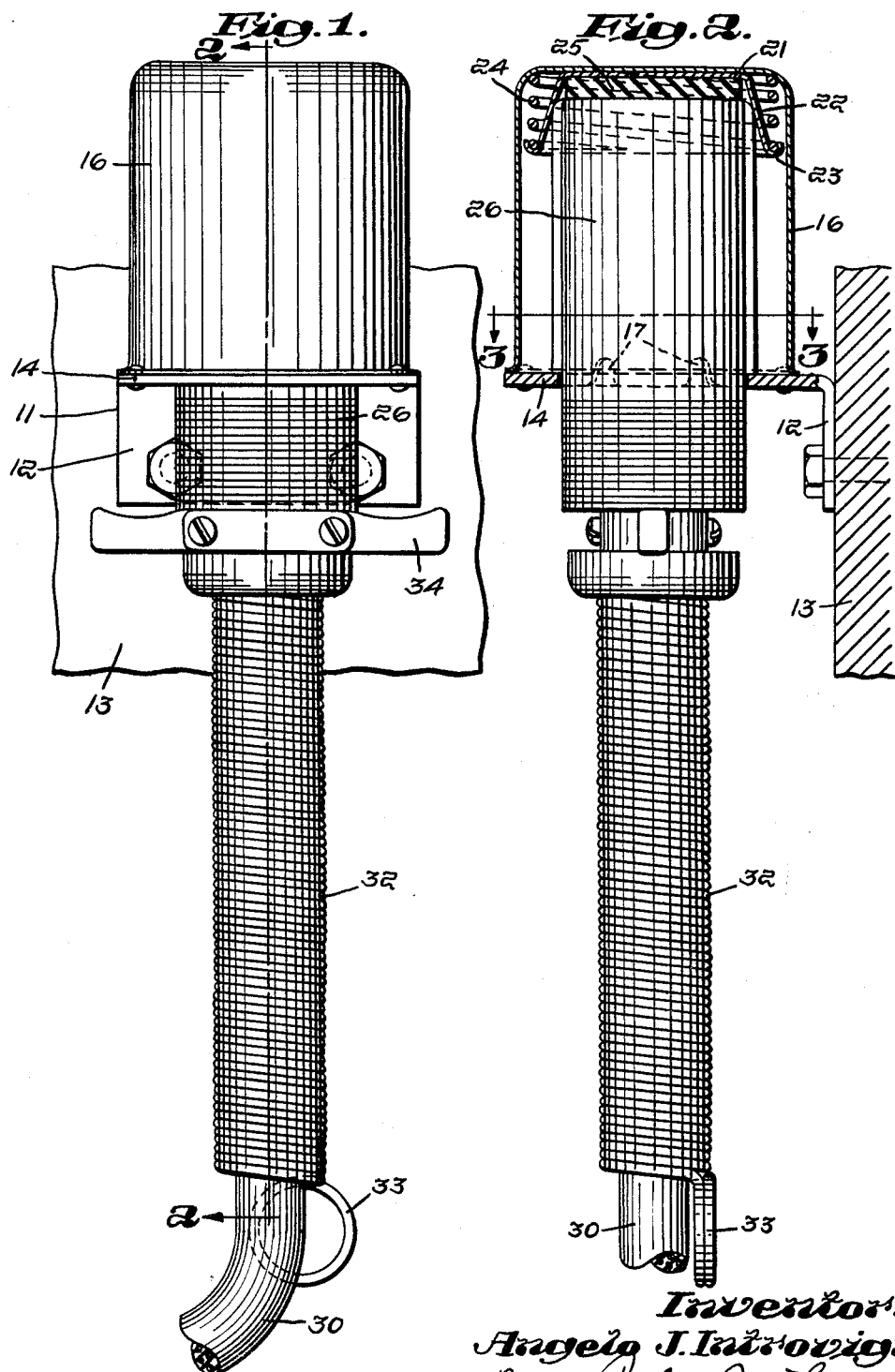
Inventor:
Angelo J. Introvigne,
by Arthur D. Thomson
Attorney

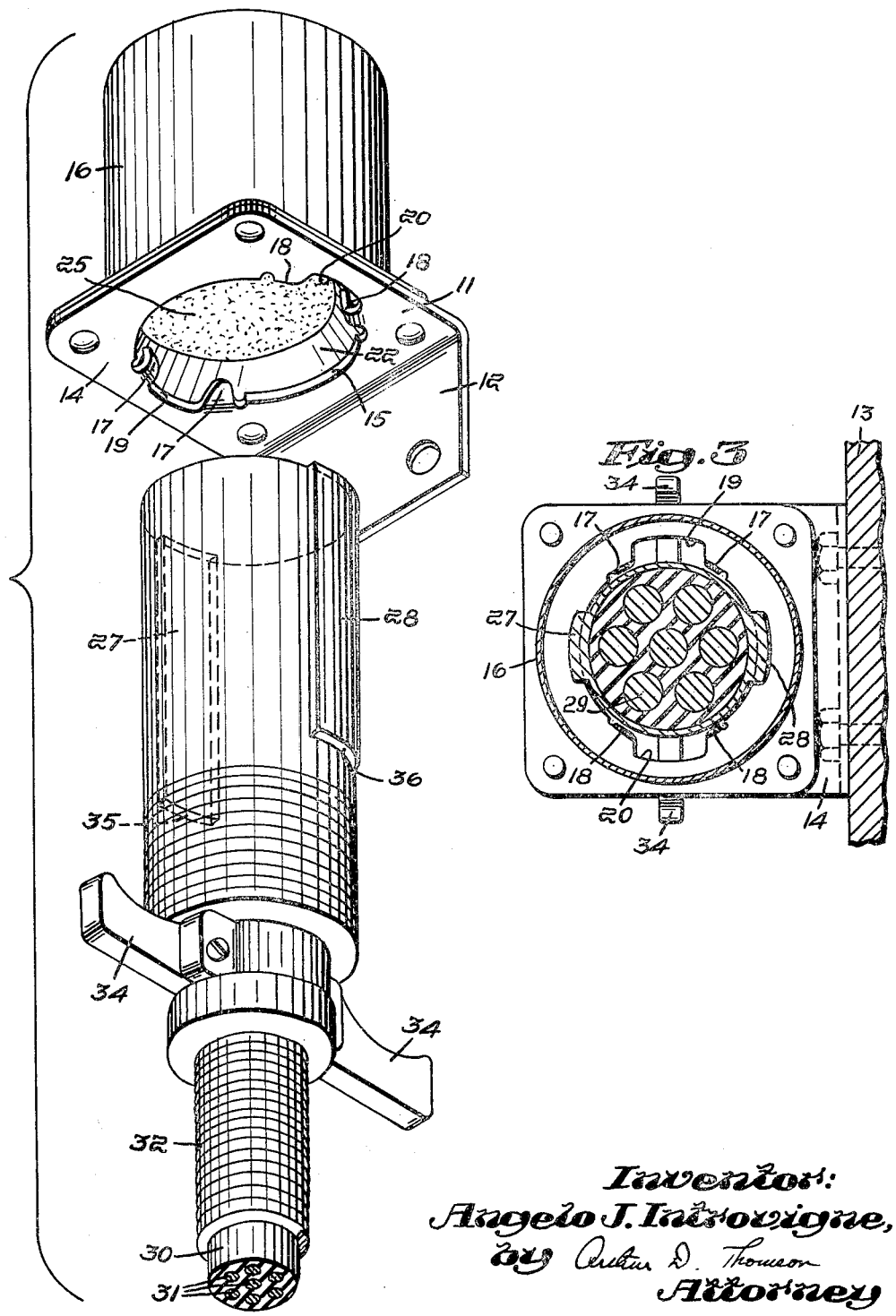

United States Patent Office 3,176,257
Patented Mar. 30, 1965

3,176,257
BRACKET FOR HOLDING TRAILER PLUGS OF TRACTOR-TRAILER VEHICLES
Angelo J. Introvigne, Stafford Springs, Conn., assignor to Cole-Hersee Company, South Boston, Mass., a corporation of Massachusetts
Filed Mar. 8, 1963, Ser. No. 263,807
2 Claims. (Cl. 339—38)

This invention relates to improvements in a bracket for temporarily housing and holding the trailer plug of a tractor-trailer when the plug is disconnected from a complemental socket or receptacle carried by the trailer.

The term "trailer plug" is the common trade name of an electrical connector at the end of a cable used for conveying current from the power circuit of the tractor to the lighting and signal circuits of a trailer having a complemental socket or receptacle mounted thereon and usually equipped with a protective cover or flap. The plug connector and the socket or receptacle connector have insulating body portions usually containing several conductors and cooperative contacts for completing a number of circuits when the complemental connectors are coupled in a well known manner.

The principal purpose of the invention is to provide a bracket which may be conveniently fastened to the cab of the tractor and which affords a housing to receive and hold the end portion of the disconnected trailer plug, so that the housed end is protected from weather and road splashes, the plug as a whole is safely supported against likelihood of damage, and the plug cable is so held that it will not become fouled with the tractor body or mechanism.

Another object of the invention is to provide improved means for removably locking the trailer plug in the housing of the bracket, so that the plug is held against accidental longitudinal displacement therein.

A preferred embodiment of the invention is illustrated on the accompanying drawings, in which:

FIG. 1 is a front elevation of the improved bracket with the trailer plug releasably locked in the housing;

FIG. 2 is a sectional view of the bracket and housing taken on line 2—2 of FIG. 1, the plug and its cable being shown in elevation, as in FIG. 1;

FIG. 3 is a section on line 3—3 of FIG. 2; and

FIG. 4 is an exploded perspective view of the separated housing bracket and plug.

The improved bracket 11 comprises an angle plate having a flange 12 adapted to be bolted or otherwise affixed to a wall 13 of the tractor cab (not shown), and a transversely projecting support 14 formed with a central opening 15; and an inverted, cup-shaped housing 16 having a bottom flange riveted or otherwise fastened to the bracket support 14, over said opening. The support portion 14 is provided with at least one set, and preferably two sets, of locking tabs 17 and 18 (FIG. 4), projecting upwardly from the rim of said opening, and inwardly of the housing; and the space between the tabs of each set constitute keyways 19 and 20 communicating with said opening, for a purpose to be described.

A spring-pressed plunger plate 21 having a flared skirt 22 formed with a curled rim 23 is movable longitudinally within the housing 16, and is normally urged toward the bracket support 14 by a coiled spring 24, one end of which seats in the curled rim 23 and the other end of which bears on the top of the housing. A gasket 25 of soft rubber, or other compressible material is suitably attached to the plunger plate 21.

The trailer plug, which is removably received and locked in the housing of the bracket, comprises, as usual, a cylindrical body 26 of insulating material having projecting keys 27, 28 disposed opposite each other on its periphery, and extending longitudinally thereof; conductors 29 extending longitudinally within the insulating body; a cable 30 carrying wires 31 electrically connected to said conductors; and, optionally, a cable protector 32 consisting of tightly coiled wire having a loop or ring 33 at its outer end, and a finger grip consisting of projecting wings 34.

A trailer plug of this general type is a commonly used connector, designed to be coupled to a complemental socket (not shown) attached to the trailer, as aforesaid; and it will be understood that the holes in the body 16 which receive the conductors 29 are usually open at the exposed end of the plug, to receive terminals located in said socket. Prior to this invention, the ring 33 of the cable protector was customarily used to suspend the disconnected plug from a hook on the tractor cab; but that expedient obviously subjected the plug body and its contacts and conductors to corrosion or other damage from moisture, precipitation and splashing, in fog or inclement weather.

Such hazards are obviated by the improved housing bracket herein disclosed, for the free end of the trailer plug, when inserted and locked in the inverted housing, is adequately enclosed and protected thereby. When the plug is to be inserted into the opening 15 of the bracket support 14, the keys 27 and 28 on its insulating body are aligned with the keyways 19 and 20 of the housing, and the plug is pressed into the housing against the resilient gasket 25 on the plunger plate 21, and then forced upwardly against the resistance of the spring 24 until the shoulders 35, 36 at the inner ends of said keys clear the locking tabs 17 and 18. The plug is then rotated, clockwise or counter clockwise, until said shoulders pass over the locking tabs and seat on the support plate 14 of the bracket. The plug is thus firmly locked in the housing by the pressure of the spring-pressed plunger plate, and by the locking tabs which constitute stops limiting rotation of the plug; the gasket 25 sealing the end of the plug against moisture within the housing 16.

The plug is quickly and easily released and withdrawn from the housing by reversing the sequence of operations just described.

Although the preferred embodiment of the invention, as herein illustrated and described, provides two keyways and two sets of locking tabs at the entrance to the housing, for slidably receiving two keys on the plug body, it will be understood that, if the trailer plug has but one key on its body portion, one keyway at the housing entrance will serve the purposes of this disclosure. It will also be appreciated that the structural details of the housing bracket herein shown may be varied to suit particular conditions without departing from the essence of this invention, as set forth in the following claims.

It will be apparent, moreover, that the words "tractor" and "trailer," as used above and in the following claims, are intended to embrace any common type of driving unit, such as a four-wheeled vehicle, and driven unit, such as a farm machine, as well as the two-wheeled tractor and merchandise conveying trailer of a tractor-trailer truck.

I claim:

1. A bracket for holding a disconnected trailer plug having a substantially cylindrical body portion provided with at least one longitudinal key having a shoulder at its inner end, said bracket comprising a plate adapted to be attached to a wall of a tractor cab and a supporting plate for a housing, said supporting plate having an opening therethrough, a cup-shaped housing mounted in inverted position on said supporting plate around said opening, said supporting plate having a keyway communicating with said opening and adapted to receive said key, and having a pair of locking tabs projecting inwardly of the housing adjacent the opposite sides of said keyway, a plunger plate movable longitudinally within said housing and engageable by an end of said plug, and resilient means in said housing normally urging said plunger plate toward said opening, whereby, when the free end of said trailer plug is inserted through said opening into the housing against said plunger plate, with the key of the plug aligned with said keyway, and pressed upwardly until the shoulder of the key clears one of said locking tabs, and the plug is then rotated, the plug will be resiliently locked in the housing by said resiliently-pressed plunger plate and said locking tab; said plunger plate having a resilient gasket adapted to engage the end of the inserted plug, to seal said plug end against moisture.

2. A bracket for holding a disconnected trailer plug having a substantially cylindrical body portion provided with at least one longitudinal key having a shoulder at its inner end, said bracket comprising a plate adapted to be attached to a wall of a tractor cab and a supporting plate for a housing, said supporting plate having an opening therethrough, a cup-shaped housing mounted in inverted position on said supporting plate around said opening, said supporting plate having a keyway communicating with said opening and adapted to receive said key, and having a pair of locking tabs projecting inwardly of the housing adjacent the opposite sides of said keyway, a plunger plate movable longitudinally within said housing and engageable by an end of said plug, and resilient means in said housing normally urging said plunger plate toward said opening, whereby, when the free end of said trailer plug is inserted through said opening into the housing against said plunger plate, with the key of the plug aligned with said keyway, and pressed upwardly until the shoulder of the key clears one of said locking tabs, and the plug is then rotated, the plug will be resiliently locked in the housing by said resiliently-pressed plunger plate and said locking tab; said plunger plate having a flared skirt formed with a curled rim, and said resilient means consisting of a helical spring having one end seated in said rim.

References Cited by the Examiner
UNITED STATES PATENTS

| | | | |
|---|---|---|---|
| 866,105 | 9/07 | Whittlesey | 174—67 X |
| 894,703 | 7/08 | Sanford | 174—67 X |
| 2,344,739 | 3/44 | Shaff | 285—376 X |
| 2,451,982 | 10/48 | Scott | 174—67 X |
| 2,658,185 | 11/53 | Hatcher | 339—188 |
| 3,029,406 | 4/62 | Huth | 339—90 X |

FOREIGN PATENTS 505,078   8/54   Canada.

DARRELL L. CLAY, *Primary Examiner.*

JOHN P. WILDMAN, *Examiner.*